Figure 3:
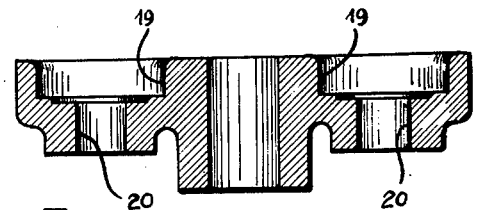

July 2, 1957     A. BÜTTNER     2,797,640
AUTOMATIC PLATEN PRINTING PRESS
Filed Aug. 11, 1954     2 Sheets-Sheet 1
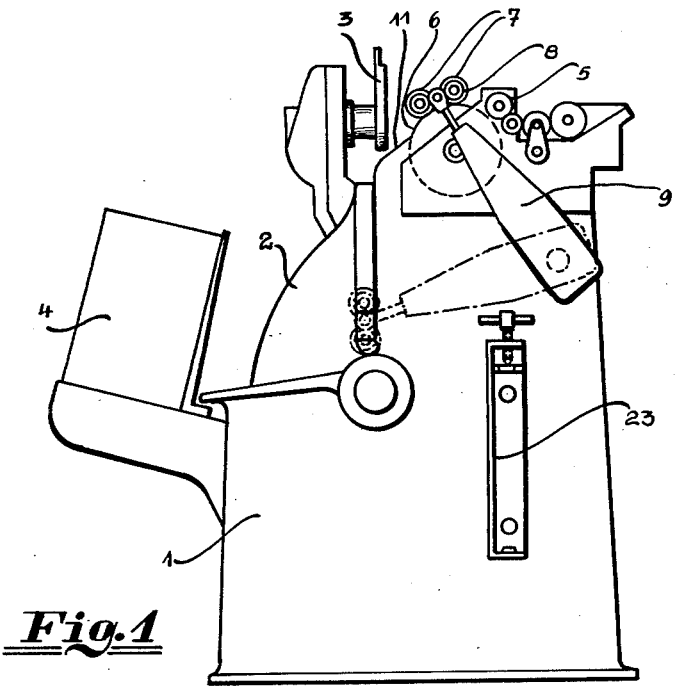
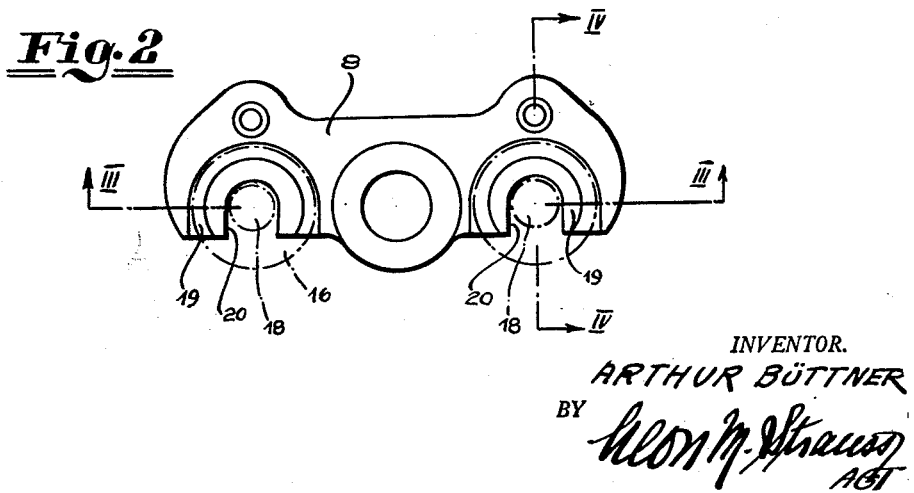
INVENTOR.
ARTHUR BÜTTNER

INVENTOR.
ARTHUR BÜTTNER

United States Patent Office 2,797,640
Patented July 2, 1957

2,797,640
AUTOMATIC PLATEN PRINTING PRESS

Arthur Büttner, Heidelberg, Germany, assignor to Schnellpressenfabrik Aktiengesellschaft Heidelberg, Heidelberg, Germany Application August 11, 1954, Serial No. 449,099

Claims priority, application Germany April 1, 1954

1 Claim. (Cl. 101—359)

This invention relates to automatic platen printing presses.

In automatic platen printing presses with cylinder inking devices, the printing form is inked by means of distributing rollers guided over the printing form by means of a swinging cylinder support. For uniform inking of said form, the distributing rollers must roll satisfactorily upon the form or upon the roller running rails disposed laterally of the form. This requirement necessitates the distributing rollers being mounted in the cylinder support with as little friction as possible, and it has therefore already been proposed to mount the distributing rollers in the cylinder support by means of ball bearings. Moreover, for operational reasons the rollers must be interchanged or a new covering cast thereupon fairly frequently, in which case the ball bearings must be removed and slid on to the spindle ends of the new or recovered roller. To this end, when ball bearings are used for the mounting of the distributing rollers, the ball bearings, contrary to prevailing technique, have their inner rings loosely pushed on to the spindle ends of the distributing rollers for the purpose of ready interchange thereof. This loose arrangement of the ball bearings upon the spindle ends of the distributing rollers leads to relatively rapid wear of the ball bearing mounting, since the inner rings rotate with the distributing roller spindle and the latter therefore undergoes considerable wear in the region of the ball bearing seating. The advantage accruing from a ball bearing mounting is therefore largely nullified by the disadvantages of this ball bearing arrangement, because the heavy wear on the distributing roller spindles very rapidly leads to untrue rotation of the distributing rollers, which alone makes it necessary to change the distributing rollers even more frequently, even though in themselves they may still be completely serviceable.

To these disadvantages of the construction heretofore known of ball bearing mountings for distributing rollers must be added the fact that, while the ball bearings in themselves generally have a long operational life, a breakdown in these bearings during operation has a very detrimental effect when such bearings are employed for the distributing roller mounting, the said breakdown being liable to cause very heavy damage to the printing machine, this being a risk which is scarcely present with the use, still generally current, of plain bearings for the mounting of the distributing rollers.

In order to obviate or minimize these disadvantages in a ball bearing mounting of the distributing rollers, it is proposed in accordance with the invention on the one hand to dispose the ball bearings fixedly, that is to say with their inner rings not adapted to rotate or slide, upon the spindle ends of the distributing rollers and to provide on the other hand a drawing-on and drawing-off device for the distributing roller ball bearings, which device is rigidly or movably connected to the frame of the machine. This makes it possible for distributing rollers to be interchanged readily as desired, even with non-movably mounted ball bearings. Moreover, in order to offset the results of a possible breakdown in the ball bearing it is proposed, in accordance with a further feature of the invention, to provide at each end of the spindle two bearing points, the inner one of which can be formed by the tightly drawn-on ball bearings and the outer one of which can be formed by a spindle end which is of smaller diameter than the ball bearing seating and which co-operates with a corresponding second recess in the associated bearing shell in the cylinder support. The outer bearing point is expediently so constructed in other respects as merely to serve as an emergency bearing point, should the ball bearing break down. This can readily be obtained if the spindle ends of the outer bearing points are normally maintained at a small distance from the associated bearing recesses so that the outer bearing points are only used for bearing purposes if the associated ball bearings are damaged or broken.

Two slots which are open on one side and which are of different widths and which are axially disposed in tandem and which are formed in each of the associated bearing shells in the cylinder support, serve to accommodate the two bearing points on the ends of each distributing roller. The more inward and broad of the said two slots serves to accommodate the ball bearing and the outer narrow slot serves to accommodate the spindle end. The base rounding and width of the inward bearing slot correspond to the diameter of the associated ball bearing, while the rounding and width of the outward slot are somewhat greater than the diameter or maximum diameter of the associated spindle end. To facilitate the sliding-on of the ball bearing, the spindle ends forming the second emergency bearing points can be of slightly conical construction. Suitably the ball bearings or spindle ends of the distributing rollers each rest in open slots upon only one side of a distributing roller, while the ball bearings or spindle ends for the other side of the distributing roller are mounted in enclosed round bores of a corresponding size in the associated bearing shells.

Figure 4:
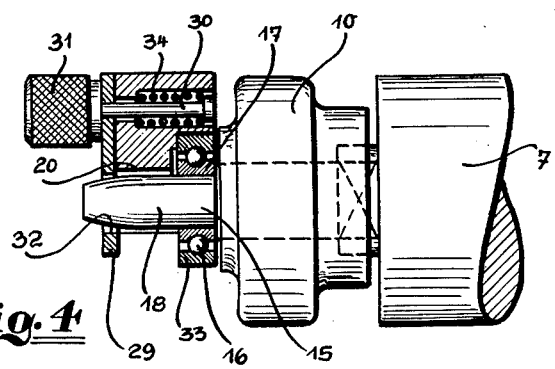
Figure 5:
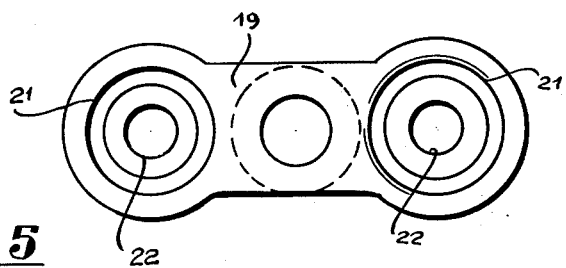

For a better understanding of the invention and to show how it may be carried into effect, the same will now be described, by way of example, with reference to the accompanying drawings, wherein:

Figure 1 is a side elevation illustrating diagrammatically an automatic platen printing press with two distributing rollers mounted in the cylinder support, and having also a device for drawing the ball bearing on and off, Figure 2 is a side elevation of a bearing shell mounted on the cylinder support and having open bearing slots, Figure 3 is a sectional view taken along the line III—III of Figure 2, Figure 4 is a sectional view taken along the line IV—IV of Figure 2 and showing also the spindle end of a distributing roller, and Figure 5 illustrates a bearing shell on the cylinder support with closed bearing bores.

The automatic platen printing press illustrated in Figure 1 comprises in manner known per se the machine frame 1 with an outwardly and inwardly swinging platen 2, on which is arranged a rotating gripping system 3 for applying and removing sheets being printed, the printed sheets being transferred to a delivery stack 4. A cylinder inking device 5, having two distributing rollers 7 adapted to receive their ink from an inking cylinder 6, serves in known manner to ink the printing form. The distributing rollers 7 are mounted upon a swinging cylinder support 9 by means of bearing shells 8 and 12, and during their swinging movements the rollers 7 are supported by guide rollers 10 upon running rails 11 in the machine frame. The distributing rollers 7, while rolling upon the said running rails, roll over the form and supply thereto the printing ink delivered by the inking cylinder 6.

In this constructional example two distributing rollers are provided, these being mounted on the one hand in the bearing shell 8 having open slots and on the other hand in the bearing shell 12 having closed bores. The bearing shells 8 and 12 are articulated in known manner to the cylinder support 9.

The ends of each distributing roller spindle (Figure 4), which is also provided in known manner with a coating of rubber or other material, carry in addition to the guide rollers 10 on a spindle end 15 one ball bearing 16 each, the inner ring 17 of which bearing is drawn fast on to the spindle end 15. An extension 18 of the spindle end is slightly conical in order to facilitate the drawing-on of the ball bearing 16. The bearing shell 8 correspondingly has two open slots 19 and 20, the slots 19 serving to accommodate the ball bearings 16. The width of the said slots corresponds to the diameter of the outer ring 33 of the ball bearing 16, while the depth of the said slots is rather greater than the radius of the outer ring 33. The bases of the slots 19 are so rounded as to correspond exactly to the outer diameter of the ball bearing 16, with the result that the outer rings 33 of the ball bearings 16 fill the slots completely.

The slots 20, the bases of which are also rounded, are coaxial with the slots 19 and are of a width or of a diameter of curvature which is somewhat greater than the greatest diameter of the conical spindle end 18, as can be seen in Figure 2.

On the other side of the machine the bearing shell 12 in the cylinder support has closed bores of which the greater bores 21, which are inwardly located when seen in the axial direction, have diameters corersponding to the external diameter of the ball bearing, while the outward bores 22, similarly to the slots 20 in the other bearing shell 8, have diameters which are rather greater than the greatest diameter of the spindle ends 18.

As long as the ball bearings 16 are functioning correctly, the distributing rollers 7 run in the bearing shells 8 and 12 or slots 19 and bores 21 thereof exclusively on the ball bearings 16. It is only if one of the said ball bearings should break down that the associated spindle end 18, as a result of the bearing pressure, comes into contact with the corresponding bearing slot 20, or with the corresponding bearing bore 22, and therefore acts as a support, so that any further developments which might result from the breakdown of the ball bearing are arrested.

When the distributing rollers 7 are changed, it becomes necessary to withdraw the ball bearings 16 from the distributing roller being changed and to draw the said ball bearings on to the new distributing roller. Moreover, when a ball bearing breaks down or becomes damaged in any way, it becomes necessary to remove the old bearing in order that a new one may be fitted. To this end a device 23 may be provided which serves to draw the ball bearings on and off and which is adapted to be secured, for example, to the machine frame (Figure 1). Since this device forms no part of the present invention, its structure will not be further described herein.

Those spindle ends of the distributing rollers located in the open slots 19 and 20 in the bearing shell 8 are held fast by the tension of the cylinder support springs in known manner. In addition to this, a pivotable safety projection 29 provides a further safeguard against this side of the distributing roller slipping out of the bearing slots. Each safety projection 29 seats upon a pin 30 which is so guided as to be withdrawable, against the action of a spring 34, from the bearing shell 8 in the cylinder support. The safety projection 29 has a knurled button 31 for actuating the safety projection 29. Each safety projection 29 has a hole 32. After the distributing roller has been fitted, the safety projection 29 is drawn out by means of the button 31 and slid by the hole 32 over the spindle end 18. When the distributing rollers are to be withdrawn, the safety projection 29 is drawn off the distributing roller spindle end and pivoted to one side.

Various changes and modifications may be made without departing from the spirit and scope of the present invention and it is intended that such obvious changes and modifications be embraced by the annexed claim.

Having thus described the invention, what is claimed as new and desired to be secured by Letters Patent, is:

A bearing arrangement for a plurality of parallel ink distributing rollers of an automatic platen printing press, each of said distributing rollers having axial spindles extending from its opposite ends, said rollers being adapted to move past and in rolling contact with the form of said press; comprising a ball bearing for each of said spindles, each ball bearing having an inner ring and an outer ring, each of said inner rings being press-fitted onto a corresponding spindle, a pair of bearing shells disposed adjacent said opposite ends of each of said distributing rollers, each of said shells being provided with a plurality of first recesses spaced from each other and accommodating said outer rings, respectively, each of said shells being provided with a plurality of second recesses communicating and coaxially aligned with said first recesses, respectively, each of said second recesses accommodating a corresponding spindle of said rollers, support means pivotally interconnecting said bearing shells with said press for reciprocal pivotal movement of said shells with respect to said press, whereby said shells bear on said outer rings and upon said reciprocal movement of said support means with said shells said rollers are moved back and forth past said form, said first and second recesses in one of said bearing shells of each pair being open over a portion of their peripheries, and safety means connected to said one bearing shell, said safety means comprising a plurality of plate-like members, means supporting said members on said one bearing shell at spaced locations and adjacent the portions of said recesses opposite said open portions thereof on the side of said one bearing shell remote from said first recesses for rotary pivotal movement in a plane substantially perpendicular to the axes of said recesses and for linear movement in a direction substantially parallel to said axes, and resilient means disposed within said one bearing shell and operatively connected to said members to normally bias the latter into engagement with said side of said one bearing shell, said members being provided, respectively, with openings dimensioned to accommodate the outer extremities of the corresponding spindles, whereby upon projection of said corresponding spindles through said openings removal of said one bearing shell from said distributing rollers is prevented, and whereby upon linear movement of said members away from said bearing shell against the force of said resilient means removal of said bearing shell from said distributing rollers may be effected.

References Cited in the file of this patent

UNITED STATES PATENTS

| | | |
|---|---|---|
| 1,534,436 | Wilkinson | Apr. 21, 1925 |
| 1,704,442 | Parkinson | Mar. 5, 1929 |
| 2,002,032 | Kluge et al. | May 21, 1935 |
| 2,042,769 | Buttner | June 2, 1936 |
| 2,091,844 | Blake | Aug. 31, 1937 |